United States Patent [19]

Finley

[11] Patent Number: 4,806,326

[45] Date of Patent: Feb. 21, 1989

[54] PHOSPHATE FEED MATERIAL FOR PHOSPHORUS ELECTRIC FURNACE

[75] Inventor: Joseph H. Finley, Metuchen, N.J.

[73] Assignee: FMC Corporation, Philadelphia, Pa.

[21] Appl. No.: 86,016

[22] Filed: Aug. 17, 1987

[51] Int. Cl.$^4$ ............... C01B 25/01; C01B 25/02; C01B 25/04; C01B 25/12

[52] U.S. Cl. .................. 423/322; 423/304; 423/318; 423/323

[58] Field of Search ............. 423/304, 318, 322, 323

[56] References Cited

U.S. PATENT DOCUMENTS

| | | | |
|---|---|---|---|
| 1,534,828 | 4/1925 | Barr . | |
| 2,040,081 | 5/1936 | Curtis | 23/108 |
| 2,776,828 | 1/1957 | Marcellus et al. | 263/53 |
| 3,032,408 | 5/1962 | Baumann | 71/64 |
| 3,345,443 | 10/1967 | Ziegler et al. | 264/117 |
| 3,773,473 | 11/1973 | Howard et al. | 23/293 R |
| 4,372,929 | 2/1983 | Barber | 423/323 |
| 4,373,893 | 2/1983 | Barber | 425/222 |
| 4,383,847 | 5/1983 | Barber | 71/34 |
| 4,421,521 | 12/1983 | Barber | 44/16 R |
| 4,451,277 | 5/1984 | Barber | 71/36 |
| 4,514,366 | 4/1985 | Barber | 423/318 |
| 4,537,615 | 8/1985 | Barber | 71/36 |
| 4,537,756 | 8/1985 | Rottgen et al. | 423/323 |

FOREIGN PATENT DOCUMENTS

| | | | |
|---|---|---|---|
| 786727 | 6/1968 | Canada | 423/322 |
| 52-155197 | 12/1977 | Japan . | |
| 649651 | 2/1979 | U.S.S.R. . | |
| 742376 | 6/1980 | U.S.S.R. . | |
| 823277 | 4/1981 | U.S.S.R. . | |

OTHER PUBLICATIONS

Pashchenko, V. N., Olontsev, I. F., Lozhkin, A. F., Mamonov, O. V. (Perm. Politekh. Inst. Perm. (USSR), Izv. Vyssh. Uchebn. Zaved., Khim. Khim. Tekhnol. 1979, Physiocochemical principles of the preparation of a granular charge for defluorination. (Abstract).

*Primary Examiner*—Gregory A. Heller
*Attorney, Agent, or Firm*—Robert D. Jackson; Frank Ianno

[57] ABSTRACT

Nodule fines, formed by abrasion of an electric furnace feed material of phosphate shale nodules, are utilized by mixing a recycle stream of the nodule fines with fresh phosphate in the presence of phosphoric acid prior to forming the shale into nodules. The phosphoric acid prevents loss in mechanical strength of the nodule caused by admixture with the nodule fines.

8 Claims, No Drawings

PHOSPHATE FEED MATERIAL FOR PHOSPHORUS ELECTRIC FURNACE

This invention relates to phosphatic feed material for a phosphorus electric furnace. More particularly, the invention is concerned with such feed material containing recovered calcined phosphate ore.

In the electrothermal manufacture of elemental phosphorus, a feed stream of phosphatic material such as calcined phosphate ore, a carbonaceous reductant such as coke and optionally a fluxing agent such as silica are charged into an electric furnace. The charge materials undergo resistive heating which results in the formation of a molten reaction mass. Reduction of the phosphate ore to phosphorus produces a gaseous mixture of phosphorus vapor, carbon monoxide and particulates. After being freed of particulates, the gaseous stream is water quenched and the phosphorus recovered and stored under water. The furnace is tapped periodically to remove molten slag and ferrophosphorus.

In a typical method of preparing the phosphatic feed material, comminuted phosphate ore is compacted into shaped articles which are then calcined to increase their crush strength. The procedure is much used in the processing f phosphate shales such as occur in the western portions of the United States. Suitable shales contain clay which undergoes sintering during calcination thereby acting as a binder for the phosphate particles to give high strength agglomerates or nodules.

Although the commercial production of phosphorus by the electric furnace method is an established industry, the handling of nodule fines continues to be a vexing and ongoing problem. Such fines are formed by abrasion of the nodule feed material during its passage from the calciner to the furnace. If, on the one hand, the nodule fines are allowed to enter the furnace along with the feed material, this causes a significant decrease in furnace efficiency. On the other hand, if the nodule fines are screened or otherwise separated from the furnace feed, they accumulate in considerable quantity. The magnitude of fines buildup can be readily appreciated considering that a phosphorus plant can generate many thousands of tons of nodule fines per year.

One proposed answer to the fines problem consists in routing a stream of recycle nodule fines to the compacting unit of a phosphorus plant. However, this approach has proved to be unsatisfactory since the nodule fines, owing to their lack of binding properties, causes a reduction in mechanical strength of phosphate nodules prepared therefrom. Such weakened nodules are prone to increased abrasion resulting in the generation of even greater quantities of nodule fines. Manifestly, recycling of nodule fines as presently contemplated is not a viable technique.

A method has now been discovered whereby nodule fines can be incorporated in a phosphate feed material without loss in mechanical strength thereof and the provision of said method and the phosphate feed material produced thereby constitutes the principal object and purpose of the invention. Other objects and purposes will become apparent in the ensuing description.

As used herein, nodule fines includes calcined particulate matter formed by attrition or abrasion of an agglomerated phosphate feed material such as lumps, grains, briquettes, pellets or the like.

Broadly, the present invention comprises (1) separating nodule fines from the agglomerated phosphate feed stream of an electric phosphorus furnace; (2) forming a mixture of the separated fines, phosphoric acid and phosphate shale; (3) forming the mixture into compacted shapes, and (4) subjecting the compacted shapes to calcination temperatures to produce phosphate agglomerates.

In operating an electric furnace phosphorus plant with provision for recycling nodule fines in accordance with the invention, nodule fines are separated from the agglomerated phosphate feed stream using techniques familiar to the art such as screening. After leaving the screener, the nodule fines are conveyed in any known manner of handling particulate material to a mixing zone where they are combined with the phosphoric acid and phosphate shale and formed into a homogeneous blend which is compacted into desired shapes such as briquettes. The shaped articles are next heated to calcining temperatures to effect sintering of the shale and thereby produce a furnace feed stream of hardened phosphate agglomerates which are then fed into the phosphorus furance.

Operation of the invention in conjunction with an existing phosphorus plant can be implemented without making any basic changes in the design or running of the plant. Some add on features would, of course, be required such as a screen to recover the abraded fines from the calcined phosphate nodules. Installation of a collector to receive the fines and means for transporting them to a mixer for blending with phosphoric acid and phosphate shale would also be needed. The mixer can be a pug mill or other commercial mixing equipment for combining solids and liquids. After leaving the mixer, the homogeneous blend of phosphoric acid, shale and nodule fines is handled in the normal plant manner for producing compacted shapes of phosphate shale followed by calcination of the shapes to give the agglomerated phosphate furnace feed.

Since calcination destroys the binding properties of shale, adding recycle nodule fines to fresh shale feed causes a proportionate reduction in binding capacity of the shale and consequent loss in mechanical strength of phosphate aggregates prepared from such nodule fines/shale mixes. Accordingly, sufficient phosphoric acid must be blended with the fresh shale/nodule fines mixes to compensate for the loss in binding capacity of the shale due to the presence of the nodule fines. Where these mixes contain shale having a high content of clay binder, lesser amounts of phosphoric acid are required to produce aggregates having satisfactory mechanical strength. Where the mixes contain shale having a low content of clay binder, greater amounts of phosphoric acid are required to produce high strength aggregates. The actual amount of phosphoric acid needed can readily be determined in the laboratory by preparing agglomerates from specimen mixes of phosphoric acid, shale and nodule fines and then testing the agglomerates for mechanical strength.

So far as can be ascertained, the shale/nodule fines mixtures should contain by weight a minimum of about 7% acid (as 100% $H_3PO_4$), preferably about 7% to about 11%, based on the combined weight of nodule fines and acid. Concentrations of acid in excess of 11% can be tolerated provided the wetness of the phosphoric acid does not interfere with compaction of the mixture.

Generally speaking, it has been found that shale/nodule fines mixtures containing on a weight basis up to about 20% of nodule fines can be satisfactorily agglomerated with phosphoric acid.

The phosphoric acid need not be pure and can be used in a variety of strengths ranging from about 30% to about 85% $H_3PO_4$. A crude grade of wet process phosphoric acid, commonly referred to as green acid, containing about 70% $H_3PO_4$ is especially preferred as it is a readily available, low cost commercial product. Increased strength in shale/nodule fines aggregates has been obtained using 70% green acid at levels as low as 2% based on the combined weight of acid and nodule fines. By raising the level of phosphoric acid to a range of from about 11% to about 15% (70% concentration), agglomerates can be produced which exceed the strength of agglomerates made by the conventional process from shale alone. Such agglomerates are more resistant to abrasion and thus generate less nodule fines.

A further advantage of the invention is that it provides means for utilization of burden dust. A byproduct of phosphorus manufacture, burden dust is the finer fraction of solids removed from the phosphorus vapors prior to quenching. Burden dust typically is made up of $-100$ mesh fines the composition of which is about 90% nodule material and the remainder coke and silica. It is obtained from the fines collector of the phosphorus plant such as a bag house or electrostatic precipitator.

Burden dust is utilized in the practice of the invention by incorporating it into the nodule fines recycle stream which can consist of up to about 30% by weight of the burden dust.

It has also been found that the mechanical strength of the compacted shapes, or green aggregates as they are known in the art, can be improved by moistening the blend of shale and recycle solids prior to adding the phosphoric acid. A preferred water content is in the range of about 10% to about 13% based on the combined solids weight. Such upgrading in green agglomerate strength results in the generation of less fines to be recycled to the compactor.

The invention is illustrated in further detail by the following test procedures and examples in which compositions are on a weight basis unless stated otherwise.

General Preparations

Piston Pellet Preparation—Cylindrical pellets approximately 1.1 inch in diameter and 1.1 inch high were prepared in a Carver Press from 35.0 grams of blends containing raw shale, nodule fines ($-6$ mesh), 70% $H_3PO_4$ and, optionally, burden dust. Pelletizing pressures were 4000 or 6000 pounds/inch$^2$ (psi).

Calcination—The green pellets, prepared as described above, were heated in a tube or muffle furnace for about one hour at 900° C.

Test Procedures

Abradability Test—This test was used to compare the mechanical strength of green and calcined pellets, prepared as described in the examples below. In each test, four pellets were weighed and placed in a 6 mesh screen (USS series), equipped with a metal cover and receiving pan. This assembly was shaken in a Tyler Model RX24 Portable Sieve Shaker for 20 minutes. The total quantity of material abraded from the pellets was determined by weighing and calculated as a percentage of the original charge.

As a general rule, it has been found that compositions yielding about 1.0% to 2.0% or less calcined abradability should produce good furnace feed briquettes, comparable to the conventional nodule feed. Such compositions are shown in the examples.

The pronounced tendency of nodule fines and burden dust to weaken green and calcined agglomerates when blended into raw shale with no supplementary binder addition is shown below. It is also seen that the addition of as little as 2% $H_3PO_4$ (70%) improves the strength of the agglomerates to a slight though significant degree (all pellets prepared in this comparison were pressed at 6000 psi).

TABLE I

Effect of Fines/Dust and a Low (2%) Binder Level

| Experiment No. | Blend Composition | % Abraded Green | % Abraded Calcined |
|---|---|---|---|
| 1 | Shale alone (10% moisture) | 2.0 | 2.2 |
| 2 | Shale: 80%, nodule fines + burden dust: 20% (nodule fines/dust in 7/3 wt. ratio) | 32.9 | 17.2 |
| 3 | Mixture 2 with 2% $H_3PO_4$ (70%) binder level, based on $H_3PO_4$ + nodule fines + dust | 16.4 | 10.2 |

EXAMPLE 1

Eighty parts of another shale batch containing 12.8% water were combined with 20 parts of nodule fines that had been moisturized to contain 10% water (burden dust was not included). Results summarized in Table II show that a slight though very significant weakening effect resulted from addition of the nodle fines to shale. That the calcined pellet strength can be improved by use of about 11% to 15% levels (based on combined weight of dry nodule fines plus acid) of 70% $H_3PO_4$ to values equivalent or better than a conventional briquetting feed is also shown in the table (all pellets pressed at 4000 psi).

TABLE II

Effect of Nodule Fines and High Binder Levels

| Blend Composition | % Abraded Green | % Abraded Calcined |
|---|---|---|
| Shale alone | 0.9 | 1.2 |
| Shale 80%; nodule fines 20% | 3.6 | 3.4 |
| Shale 80%; nodule fines 20% + 11.1% $H_3PO_4$ (70% concentration) | 1.7 | 0.9 |
| Shale 80%; nodule fines 20% + 15.4% $H_3PO_4$ (70% concentration) | 1.5 | 1.0 |

EXAMPLE 2

Eighty parts of shale containing 10.0% water were combined with 20 parts of a moistened (10% $H_2O$) blend consisting of 70% nodule fines and 30% burden dust, by weight. Pellets were prepared from this mixture by briquetting at 4000 psi and calcined as described previously. As shown in Table III below, those pellets which contained no $H_3PO_4$ binder were considerably weaker than simularly prepared agglomerates containing shale alone. However, when enough 70% $H_3PO_4$ was added to the mixture to supply a 15.3% binder level (based on the combined weight of dry nodule fines, dry dust and acid) and this new mixture was pelletized and calcined, the mechanical strength was essentially equivalent to that obtained with shale alone by the Abradability Test.

TABLE III

| Test No. | Pellets Tested | % Abraded (Calcined) |
| --- | --- | --- |
| 1 | Shale alone | 2.0 |
| 2 | Shale, 80%, 20% blend containing 70/30 nodule fines to dust (no binder) | 100 |
| 3 | Mixture from Test 2, containing 15.3% H$_3$PO$_4$ (70%) level, based on nodule fines and dust | 2.3 |

I claim:

1. In the manufacture of elemental phosphorus by the electric furnace method in which comminuted phosphate shale ore is compacted into shapes and the shapes calcined to give a furnace feed material of calcined phosphate nodules, the improvement of utilizing nodule fines formed from abrasion of the phosphate nodules comprising mixing a stream of recycle nodule fines with the comminuted phosphate shale in the presence of sufficient phosphoric acid to overcome the loss in mechanical strength of the nodules resulting from mixing the phosphate shale with the nodule fines.

2. The method according to claim 1 wherein the concentration of the phosphoric acid (as H$_3$PO$_4$) is from about 30% to about 85%.

3. The method of claim 2 wherein the phosphoric acid is 70% H$_3$PO$_4$.

4. The method of claim 3 wherein the amount of phosphoric acid is at least about 7% to about 11% (on a 100% acid basis) based on the combined weight of acid plus dry nodule fines.

5. The method of claim 3 wherein the amount of 70% phosphoric acid is from about 10% to about 14%.

6. The method of claim 1 wherein up to about 20% of nodule fines is recycled to the shale.

7. The method of claim 6 wherein burden dust is blended with said recycle nodule fines to give a recycle blend of nodule fines and burden dust containing up to about 30% by weight of burden dust and the amount of phosphoric acid employed is about 7% to about 11% (on a 100% acid basis) based on the combined weight of acid plus dry nodule fines and dry burden dust.

8. The method of claim 1 wherein the amount of phosphoric acid is at least about 7% (on a 100% acid basis).

* * * * *